(12) United States Patent
Vessereau et al.

(10) Patent No.: US 7,646,480 B2
(45) Date of Patent: Jan. 12, 2010

(54) BOREHOLE IMAGING

(75) Inventors: Patrick Vessereau, Hericy (FR); Philip Cheung, Montesson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 107 days.

(21) Appl. No.: 11/530,609

(22) Filed: Sep. 11, 2006

(65) Prior Publication Data

US 2007/0242265 A1 Oct. 18, 2007

(30) Foreign Application Priority Data

Sep. 12, 2005 (EP) ................... 05291884

(51) Int. Cl.
*G01N 21/00* (2006.01)
*G01V 5/04* (2006.01)

(52) U.S. Cl. ................. 356/241.1; 356/241.6; 250/254; 250/269.1

(58) Field of Classification Search ... 356/241.1–241.6, 356/435; 250/254, 256, 269.1
See application file for complete search history.

(56) References Cited

U.S. PATENT DOCUMENTS

| 3,091,235 | A | | 5/1963 | Richards |
| 4,567,759 | A | | 2/1986 | Ekstrom et al. |
| 4,672,437 | A | * | 6/1987 | Casper ....................... 348/126 |
| 4,752,127 | A | * | 6/1988 | Zafred ...................... 356/241.1 |
| 4,822,154 | A | * | 4/1989 | Oxford et al. ............... 359/367 |
| 4,919,533 | A | * | 4/1990 | Bowley et al. ................ 356/30 |
| 4,921,326 | A | | 5/1990 | Wild et al. |
| 4,941,457 | A | * | 7/1990 | Hasegawa .................... 600/142 |
| 5,644,394 | A | * | 7/1997 | Owens ..................... 356/241.5 |
| 5,663,559 | A | * | 9/1997 | Auzerais et al. .......... 250/269.1 |
| 5,790,185 | A | | 8/1998 | Auzerais et al. |
| 6,140,637 | A | | 10/2000 | Mullins et al. |
| 6,355,928 | B1 | | 3/2002 | Skinner et al. |
| 6,580,449 | B1 | * | 6/2003 | Meltzer ........................ 348/85 |
| 7,206,067 | B2 | * | 4/2007 | Jensen et al. ............. 356/241.1 |
| 7,369,225 | B2 | * | 5/2008 | Messerschmidt et al. . 356/241.1 |
| 2001/0015804 | A1 | * | 8/2001 | Doyle, Jr. ................ 356/241.1 |
| 2002/0168158 | A1 | | 11/2002 | Furusawa et al. |
| 2004/0032583 | A1 | * | 2/2004 | Huston et al. ............. 356/241.1 |
| 2004/0061858 | A1 | * | 4/2004 | Pope et al. ................... 356/435 |
| 2007/0296810 | A1 | * | 12/2007 | Vessereau et al. ............. 348/85 |

FOREIGN PATENT DOCUMENTS

| EP | 0279576 | 8/1988 |
| EP | 0533771 | 3/1996 |

* cited by examiner

*Primary Examiner*—Hoa Q Pham
(74) *Attorney, Agent, or Firm*—Darla P. Fonseca; Jaime Castano

(57) ABSTRACT

Apparatus for imaging the wall of a borehole drilled through an underground formation, comprising: a light source; an optical detector device such as a CCD camera; a sensor head including a window for application against the wall of the borehole, the light source being connected to the sensor head so as to illuminate the region of the borehole wall when the sensor head is applied to the wall; and an optical fiber bundle connecting the window to the optical detector device so as to pass optical signals from the wall to the optical detector device; wherein the optical fiber bundle comprises a coherent bundle, each fiber of the coherent bundle providing one pixel of a two-dimensional, multi-pixel image of the borehole wall.

10 Claims, 6 Drawing Sheets

BOREHOLE IMAGING

TECHNICAL FIELD

This invention relates to apparatus and techniques for obtaining high-resolution images of underground formations through which a borehole is drilled.

BACKGROUND ART

A number of techniques have been previously proposed for obtaining images of a formation at the wall of a borehole. Such images are useful in understanding the geology and lithology of the formation. Such information can be particularly useful when drilling boreholes such as oil and gas wells since it can help to identify the presence of desirable fluids and provide information allowing effective completion of the well.

The use of video technology for inspecting the inside of boreholes is known. An example can be found in U.S. Pat. No. 5,790,185. This technique is typically used to obtain images of large scale structure in the borehole, for example the state of casing or perforations. Such an approach requires the presence of a transparent fluid in the well and so cannot be used in the drilling or production phase of a well in which opaque fluids are present.

Certain high-resolution imaging techniques have been proposed for use in the drilling and production phase of the well. Such techniques include measuring properties of the formation such as electrical properties (local conductivity or permittivity), acoustic properties (acoustic impedance or formation slowness) or nuclear properties (density, photoelectric effect). These high resolution measurements made at the borehole wall can be displayed as a two-dimensional image. U.S. Pat. No. 4,567,759 discloses one such example of this approach.

U.S. Pat. No. 6,140,637 describes a technique for detecting the presence of hydrocarbon by fluorescence measurements. The tool described comprises a light source and a sensor in a tool body connected to a sensing head by means of an optical fibre bundle. The sensor head includes a window that is pressed up against the borehole wall so that light illuminating the borehole wall can cause hydrocarbons to fluoresce and the resulting light passed back to the sensor for detection. The purpose of this measurement is to detect the presence of hydrocarbon. The nature of the measurement does not allow an image to be obtained.

U.S. Pat. No. 3,091,235 describes a form of diagnostic instrument that has become known as a fibrescope or endoscope. A optical fibre bundles are used to illuminate a remote site and transfer an image back for analysis. A coherent fibre bundle is used to ensure that the image is properly transferred.

This invention aims to provide techniques that allow high-resolution optical images to be obtained of the borehole wall that can allow features of the formation the be viewed that are otherwise unavailable with other imaging techniques.

DISCLOSURE OF THE INVENTION

One aspect of the invention comprises apparatus for imaging the wall of a borehole drilled through an underground formation, comprising:
 a light source;
 an optical detector device;
 a sensor head including a window for application against the wall of the borehole, the light source being connected to the sensor head so as to illuminate the region of the borehole wall when the sensor head is applied to the wall; and
 an optical fibre bundle connecting the window to the optical detector device so as to pass optical signals from the wall to the optical detector device;

wherein the optical fibre bundle comprises a coherent bundle, each fibre of the coherent bundle providing one pixel of a two-dimensional, multi-pixel image of the borehole wall.

The optical detector device is preferably an imaging device such as a CCD or CMOS camera.

The optical fibre bundle is preferably coherent at the window and at the optical detector device. It is not essential that it be coherent between these points. Coherency can be provided by the geometrical arrangement of the fibres in the bundle, electronically, or a combination of both.

It is preferred that the optical fibre bundle is also used to connect the light source to the window, one or more light source fibres being provided adjacent the coherent bundle at least at the window.

The apparatus can also comprise means for cleaning the region of the borehole wall to which the sensor is applied so as to remove any material deposited on the borehole wall. Preferred embodiments include a supply of pressurised fluid that can be directed against the region of the borehole wall to which the sensor head is applied, an actuator for forcing the sensing head against the borehole wall, and/or a mechanical cutter operable to remove material from the borehole wall.

The sensing head being carried on an arm moveably mounted on a tool body. The optical detector device can be mounted in the tool body, as can the light source.

A particularly preferred embodiment of the invention includes two or more sensor heads mounted on a pad that optionally also includes other forms of imaging device. In such a case, the two or more sensor heads can be configured to make measurements at different resolutions.

A conveyance system for moving the apparatus along the borehole while the sensor head is applied to the borehole wall can comprise a wireline cable, coiled tubing or a logging while drilling system.

The use of a coherent fibre bundle to obtain the image of the borehole wall allows detailed images of the formation to be obtained, the large number of small fibres at the window providing the necessary resolution to obtain images of grain structure and the like.

BRIEF DESCRIPTION OF THE DRAWINGS

The invention will now be described with reference to the accompanying drawings, in which.

MODE(S) FOR CARRYING OUT THE INVENTION

Figure 1:
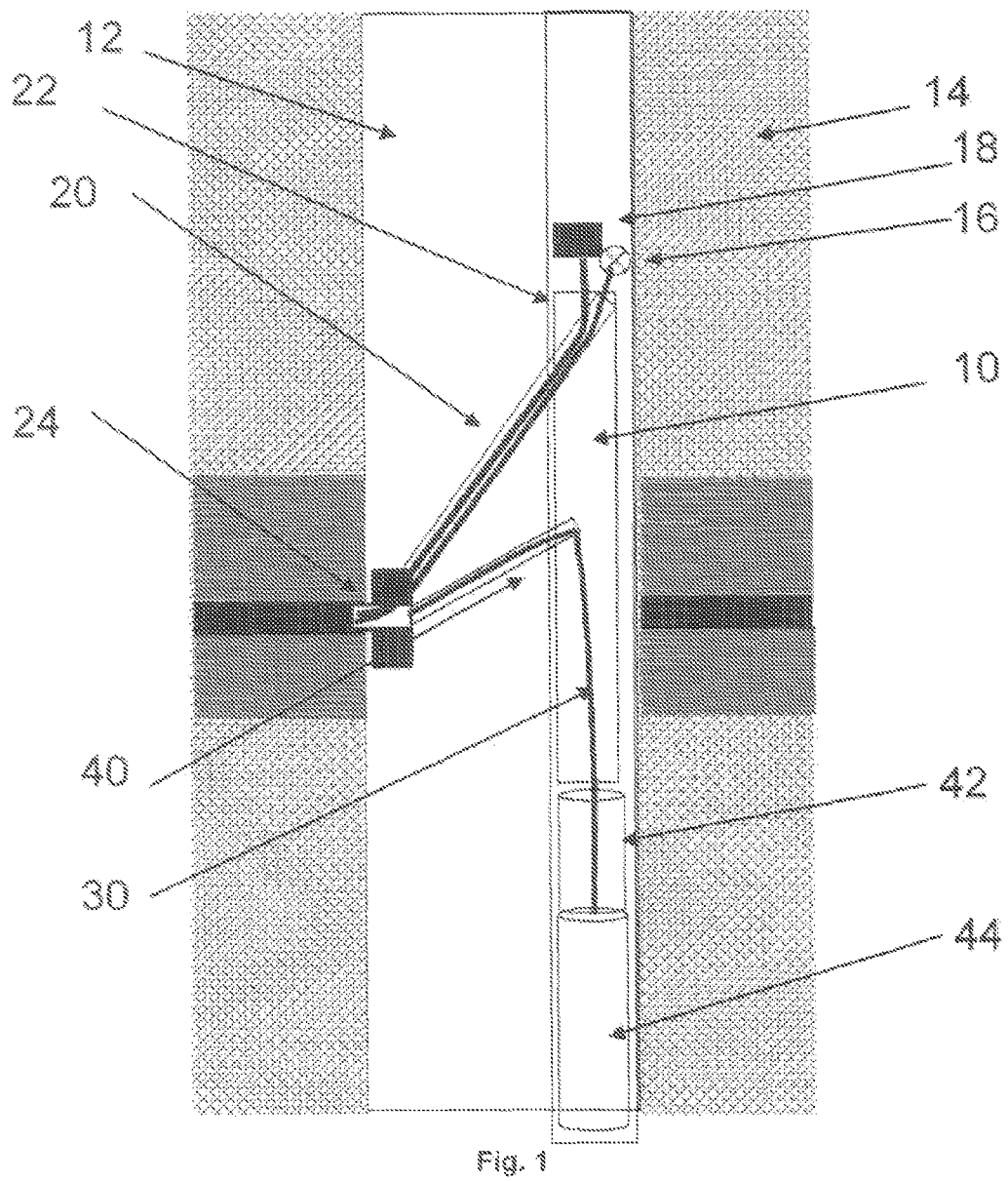
FIG. 1 shows apparatus according to a first embodiment of the invention.
Figure 2:
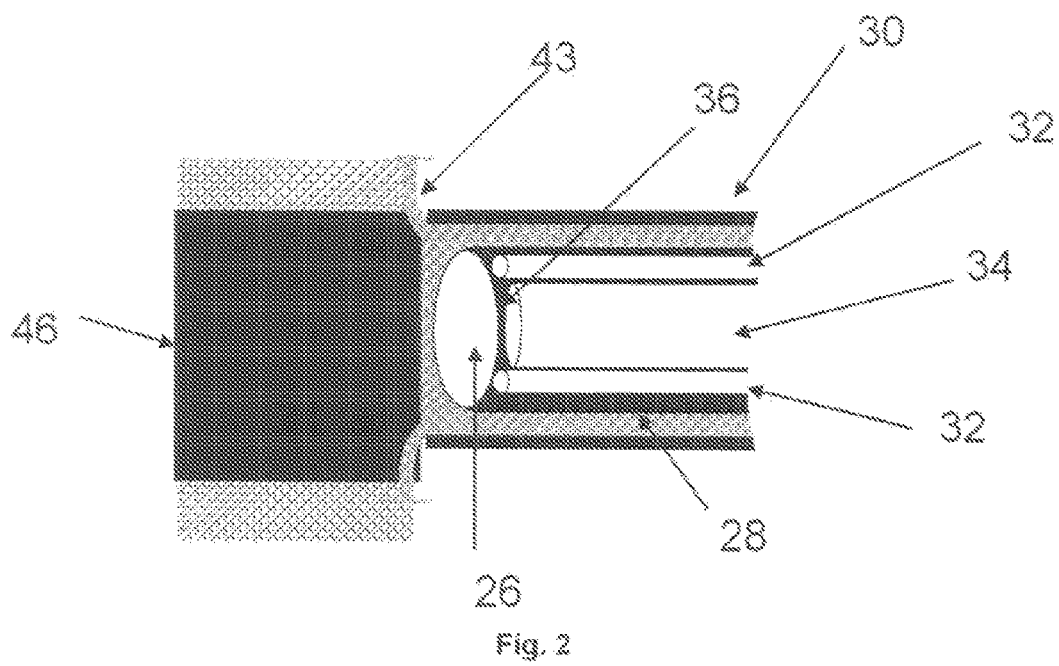
FIG. 2 shows a detailed view of the sensor head of the embodiment of FIG. 1.

A first embodiment of the invention is shown in FIGS. 1 and 2, and comprises a tool body 10 that is lowered into a borehole 12 that has been drilled through an underground formation 14. The tool body 10 is suspended on a wireline cable (not shown) which extends to the surface and allows the tool 10 to be lowered and raised in the borehole, and provides power and a data communication path back to the surface. Another form of conveyance applicable is coiled tubing which can also carry a cable for power and data. In this respect, tools according to the invention behave in the same manner as other logging tools.

The tool body 10 carries a light source 16 (such as a red LED, UV or IR lamp, white light lamp, laser or other such device) and an imaging device in the form of a CCD (or CMOS) camera 18.

A sensor arm 20 is pivotally connected to the tool body 10 at one end 22 and carries a sensor head 24 in the form of a pad at its other end. The sensor head 24 has an optical window 26 with a focusing lens mounted at the end of a sleeve 28. The sleeve 28 sits inside a rubber tube 30 which defines a flow passage around the sleeve 28. A fibre optic bundle extends between the window 26 and the light source 16 and CCD camera 18, through the sleeve 28 and along the sensor arm 20. The fibre optic bundle comprises two main elements: a light source bundle 32 (shown here as two fibres but potentially in any form), and a coherent image bundle 34. The lens in the window 26 is arranged to focus an image on the end 36 of the coherent bundle 34.

The coherent bundle 34 typically comprises a bundle of 1000 or more individual fibres forming a bundle about 1-2 mm across at its end 36 (e.g. 30,000 fibres forming a bundle with 1.5 mm OD). The coherent bundle 34 is used as a means of transferring a two-dimensional image. Therefore the geometrical arrangement of the fibres at the end 36 must be the same as that where the bundle 34 meets the camera 18. The term 'coherent' is used here to indicate a fibre bundle with the same geometric arrangement at both ends of the bundle. Each fibre in the coherent bundle effectively defines a pixel in a two-dimensional image, the size of the individual fibres and the focusing effect of the lens defining the resolution of that image.

The sleeve 28 protects the optical fibre bundle from the effects of the borehole environment.

A backup arm 40 also connects the sensor head 24 to the tool body 10 below the connection point of the sensor arm 20. The rubber tube 30 extends through the backup arm 40 into the tool body 10 to connect to a pump unit 42 which draws fluid 43 from a reservoir 44 and pumps it at high pressure through the tube 30 onto the wall 46 of the borehole 12 adjacent the sensor head 24. In this way, any material that has built up on the wall 46, such as mud cake, can be removed to leave the formation clean and visible to the sensor head.

Once the head 24 is in place against the wall 46, the tool is logged up the well in the conventional manner, the camera 18 recording a continuous image of the wall 46, the flow of fluid 43 continuously cleaning the wall 46 in order to obtain a good image.

The output from the camera 18 is sent to the surface for analysis and visualisation in printed and/or on-screen form, for example. The output data can be pre-processed downhole (e.g. compressed or filtered) prior to being sent to the surface, typically via wireline telemetry.

Figure 4:
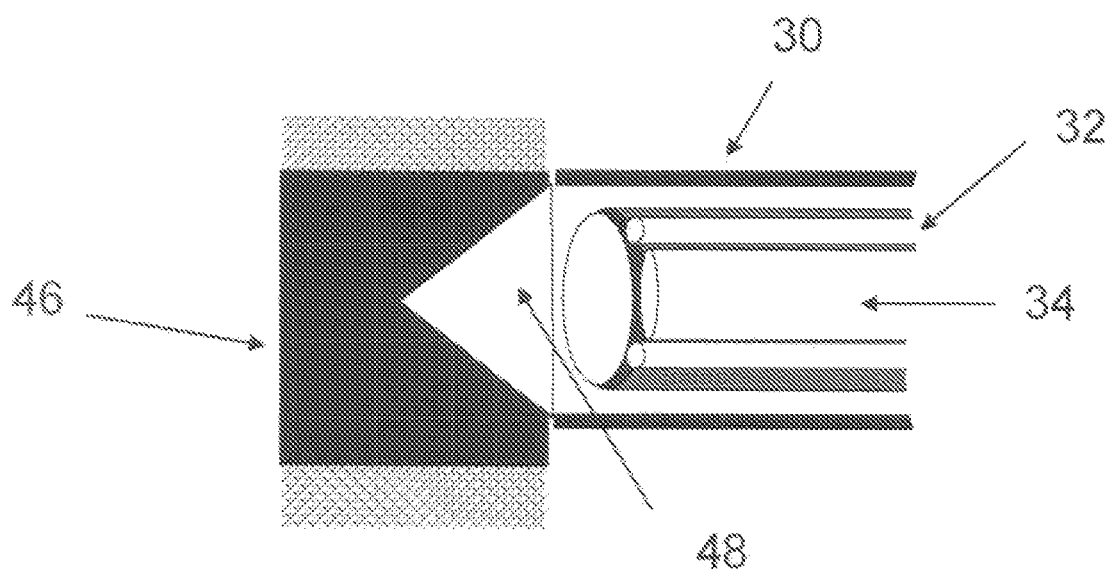
FIG. 4 shows a detailed view of the sensor head of the embodiment of FIG. 3.
Figure 5:
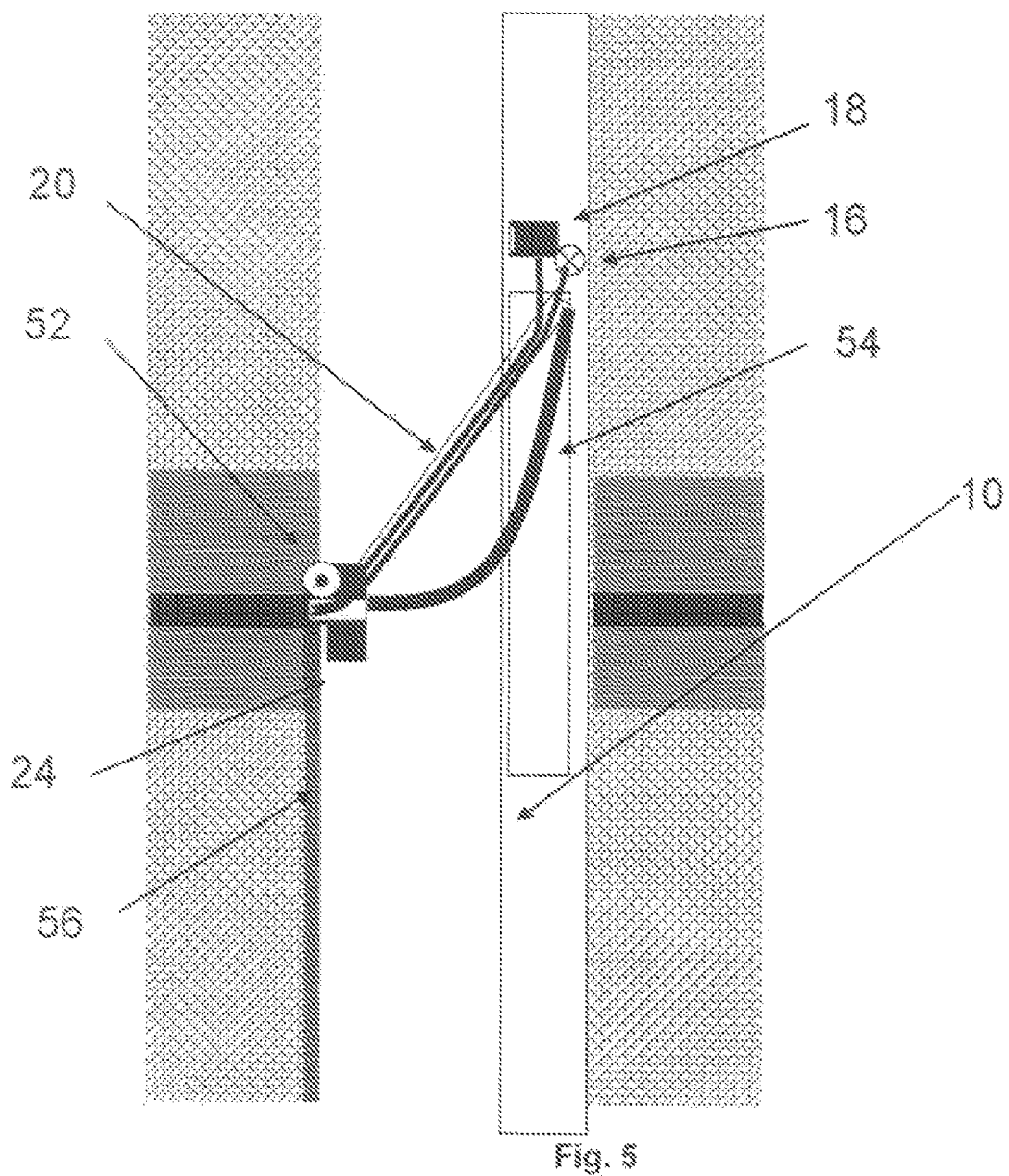
FIG. 5 shows apparatus according to a third embodiment of the invention.
Figure 6:
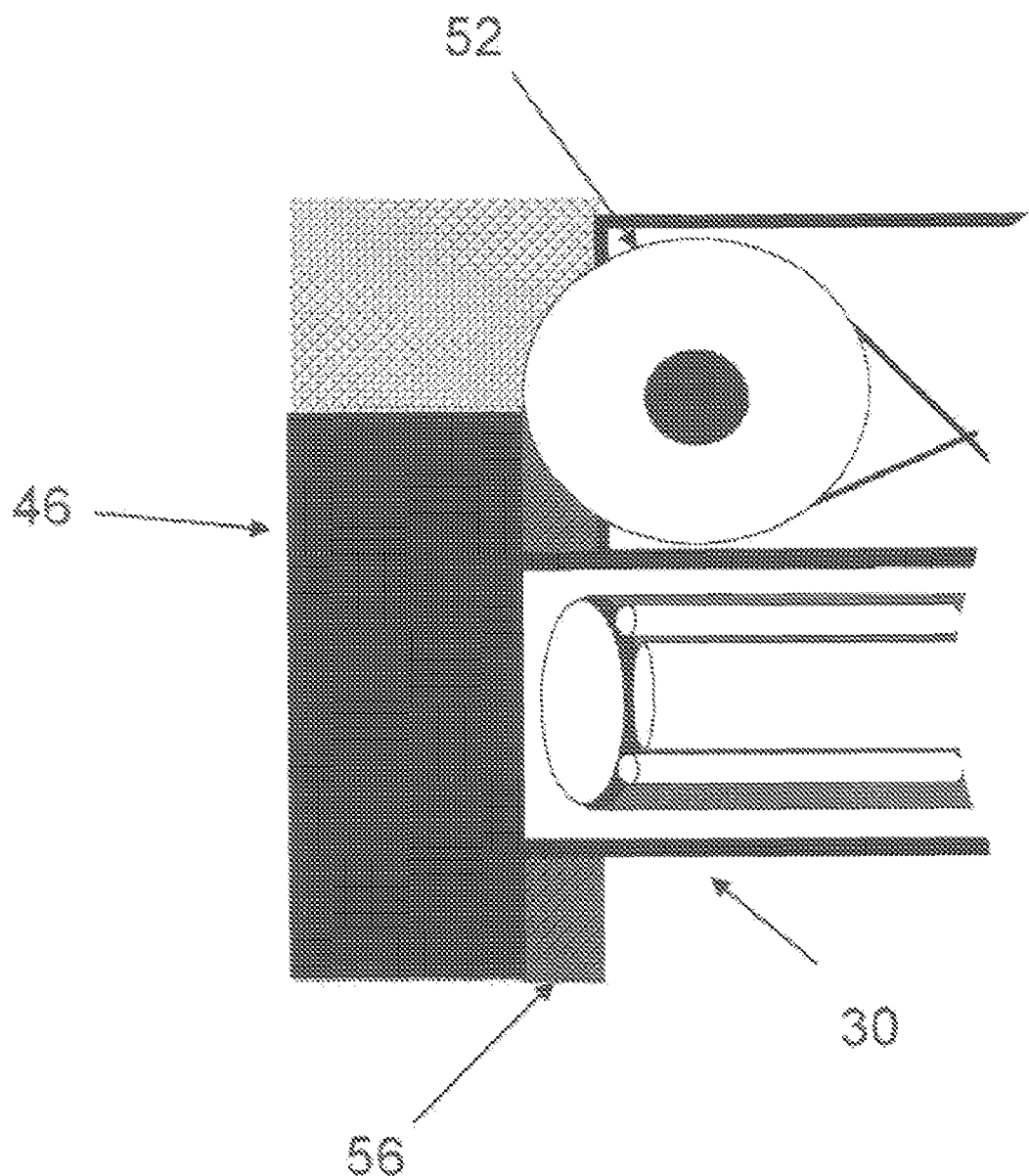
FIG. 6 shows a detailed view of the sensor head of the embodiment of FIG. 5.

FIGS. 4-6 show other embodiments of the invention with different means for cleaning the borehole wall so as to obtain a good image.

Figure 3:
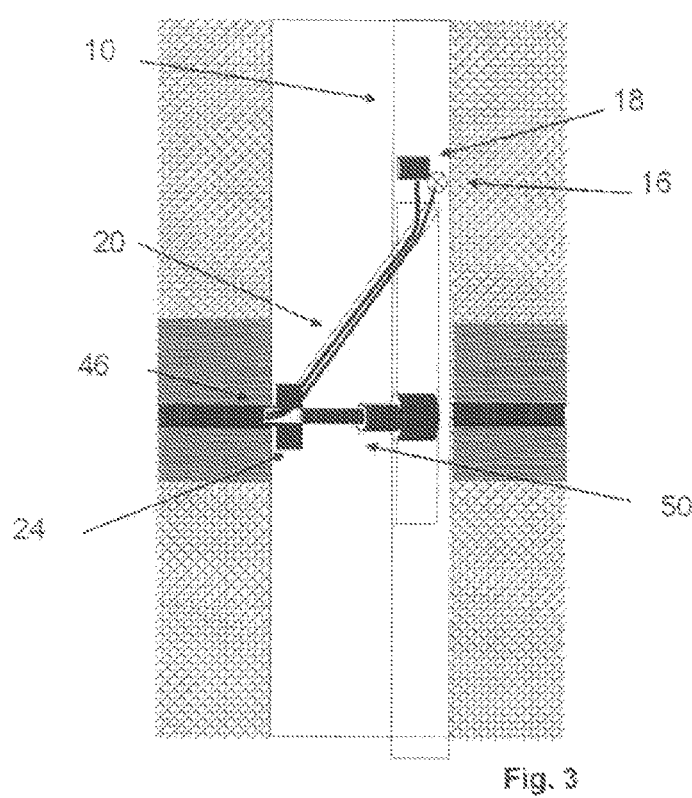
FIG. 3 shows apparatus according to a second embodiment of the invention.

In the embodiment of FIGS. 3 and 4, the supply of high pressure fluid is replace by a hard, abrasion-resistant window 48 (e.g. diamond) which is pressed against the wall 46 by a ram 50 which replaces the backup arm. The ram 50 can be mechanically, electromechanically or hydraulically operated to force the window 48 through the mud cake and into contact with the formation 14, the tool body 10 being urged against the other side of the borehole 12 to provide the reaction. The window 48 then removes the material as the tool is logged up the well.

In the embodiment of FIGS. 5 and 6, the sensor head 24 carries a milling cutter 52 which is connected back to the tool body 10 by means of a power cable 54. When the sensor head 24 is placed against the wall 46 and the cutter 52 operated, a groove 56 is cut in the wall 46 in which the window 26 is in order to obtain the image.

Figure 7:
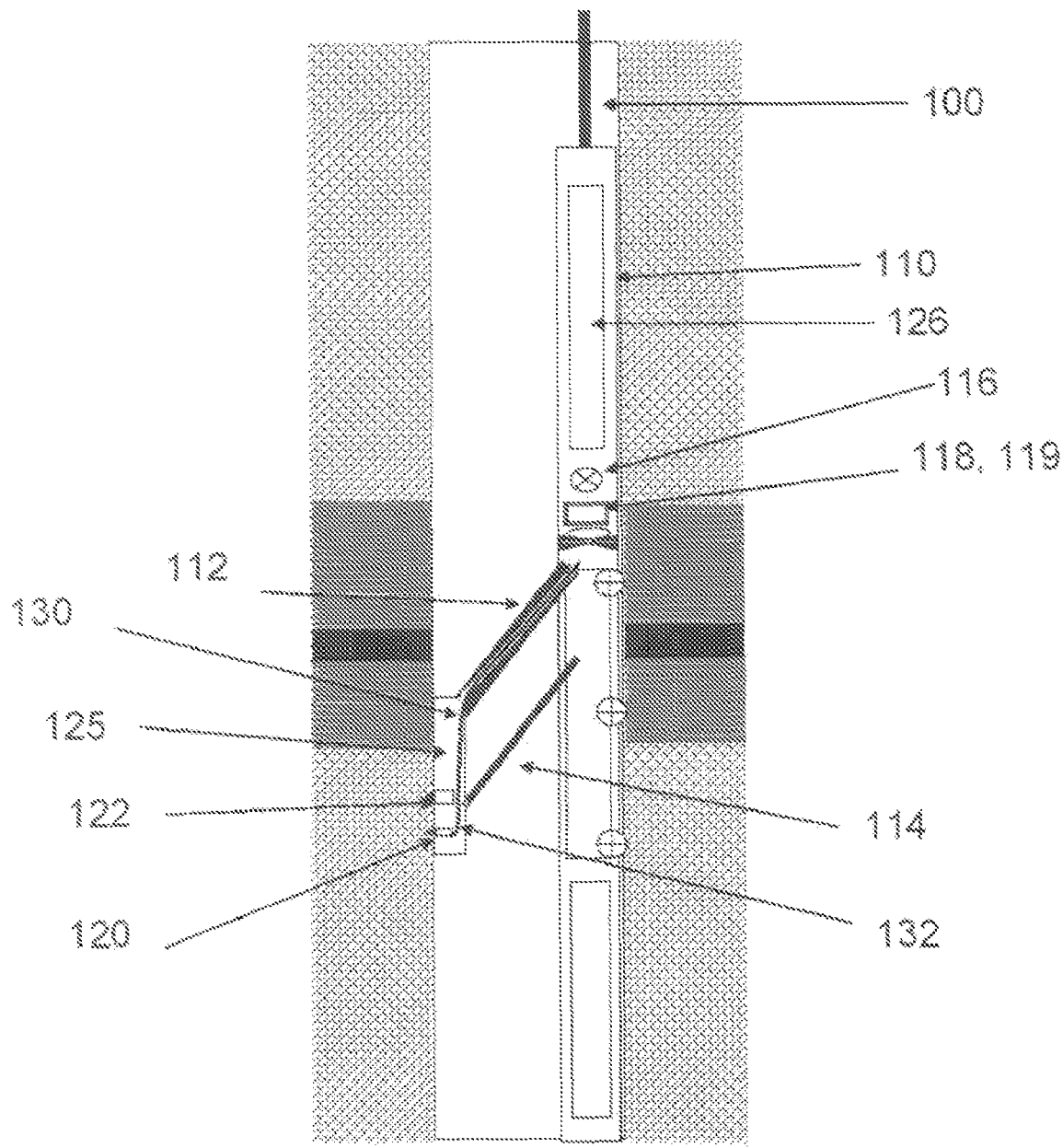
FIG. 7 shows apparatus according to a fourth embodiment of the invention.

FIG. 7 shows a fourth embodiment of the invention. The general tool arrangement is similar to that described previously with a main tool body 110 suspended on a wireline cable 100. The tool body 110 houses a light source 116 and an electronics cartridge 126. A sensor pad 125 is mounted on the tool body 110 by means of an arm 112 and a backup arm 114 is provided to ensure that the pad 125 can be held against the borehole wall in the correct orientation. The pad carries two sensor heads 120, 122, each comprising a diamond (typically transparent, synthetic diamond), plough structure acting as a separate sensor window. The sensor heads 120, 122 have a sharp, cutting structure that allows them to cut into the formation and obtain a clear image. Each sensor head is connected to a coherent fibre bundle 130, 132 that extends to the tool body 110 along the arm and connects to the light source 116 and to a respective camera 118, 119. The two sensor heads 120, 122 are arranged to provide different levels of optical resolution. The first head 120 is arranged to give a 5 µm resolution imaging over a 1 mm width. The second head 122 is arranged to give a 50 µm resolution over a 5 mm width. The different resolutions are provided by using different window sizes and different bundle sizes.

The output of each camera 118, 119 is provided to the electronics cartridge where it is transmitted to the surface in the usual manner.

The pad can also carry an imaging system such as microresistivity, to provide a further level of resolution and allow the optical measurements to be correlated with structures visible in conventional imaging techniques. Corresponding sensors on the pad and electronics in the tool body are provided.

Fine resolution can show details of microporosity and be useful for cementation analysis, medium resolution allows fractal dimensions to be seen, and these can both be placed in context of the existing imaging resolution techniques at a third resolution.

It will be appreciated that a number of changes can be made to the described embodiments while still remaining within the scope of the invention. For example, the sensor head could be mounted in the tool body which can be pressed against the formation. This approach may be particularly suitable for logging while drilling applications. Alternatively, the sensor head could be mounted in a drilling stabiliser.

Because the image is a proper optical image, relatively little processing may be required other than compression for transmission. The image can be stored as a video file rather than in the traditional log format or log image format.

The resolution of the optical system can be selected according to the desired features to be seen. Such features include micro- meso- and macro-porosity, grain shape, connectivity, mineralogy, environmental deposition and clay volume, amongst others.

The invention claimed is:

1. Apparatus for imaging the wall of a borehole drilled through an underground formation, comprising:
    a light source;
    an optical imaging device;
    a sensor head including a window for application against the wall of the borehole, the light source being connected to the sensor head so as to illuminate the region of the borehole wall when the sensor head is applied to the wall; and
    an optical fibre bundle connecting the window to the optical imaging device so as to pass optical signals from the wall to the optical imaging device; wherein the optical fibre bundle comprises a coherent bundle that is coherent at the window and at the optical detector device, each fibre of the coherent bundle providing one pixel of a two-dimensional, multi-pixel image of the borehole wall.

2. Apparatus as claimed in claim 1, wherein the imaging device is a CCD or CMOS camera.

3. Apparatus as claimed in claim 1, wherein the optical fibre bundle is also used to connect the light source to the window.

4. Apparatus as claimed in claim 3, wherein the optical fibre bundle comprises one or more light source fibres adjacent the coherent bundle at least at the window.

5. Apparatus as claimed in claim 1, comprising a tool body, the sensor head being carried on an arm moveably mounted on the tool body.

6. Apparatus as claimed in claim 5, wherein the optical detector device is mounted in the tool body.

7. Apparatus as claimed in claim 1, comprising two or more windows mounted on a pad for application to the borehole wall, each window having an associated fibre bundle.

8. Apparatus as claimed in claim 7, wherein the windows and associated fibre bundles are arranged to make measurements at different levels of optical resolution.

9. Apparatus as claimed in claim 7, wherein the pad further comprises at least one other, non-optical imaging system.

10. The use of an apparatus as claimed in claim 1 to obtain an image of the borehole wall.

* * * * *